Aug. 12, 1969    O. J. KNUTSON    3,460,247
METHOD OF MAKING A FLAT TOP COIL
Filed Feb. 1, 1966
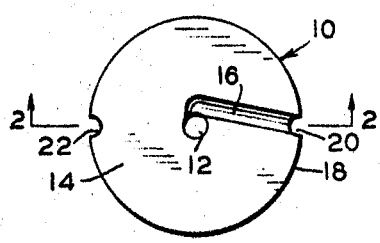
FIG. 1.
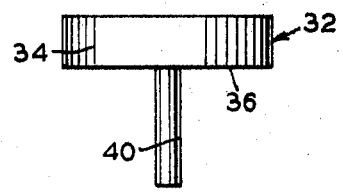
FIG. 3.
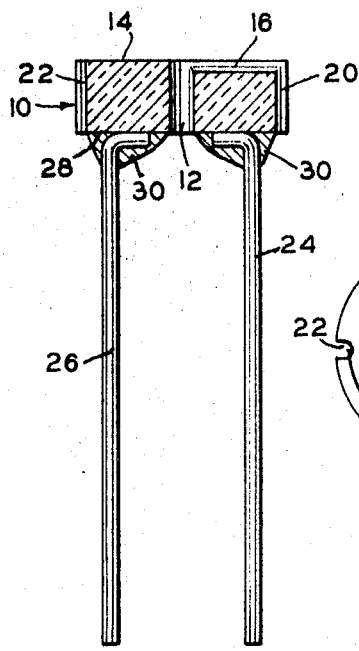
FIG. 2.
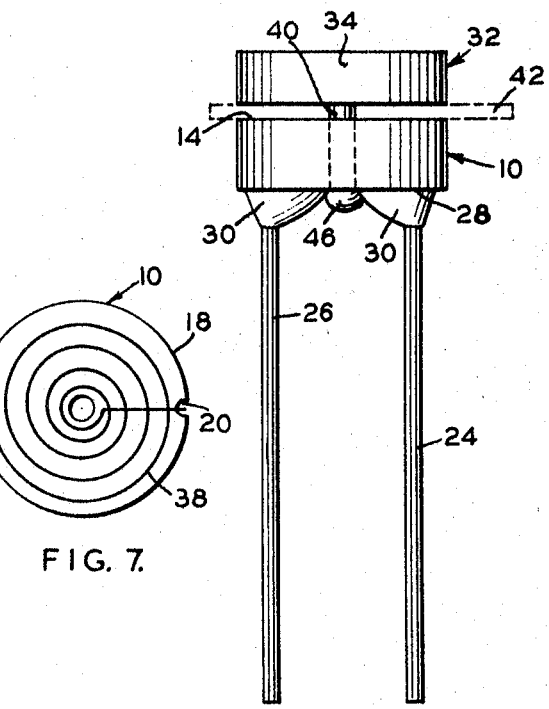
FIG. 7.
FIG. 4.
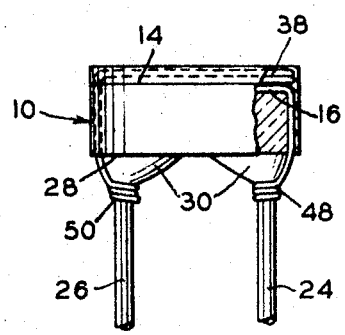
FIG. 5.
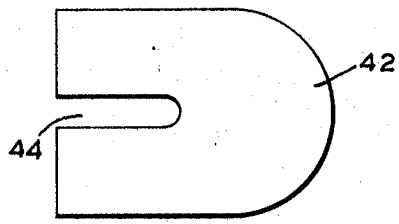
FIG. 6.
INVENTOR.
OLIVER J. KNUTSON
BY
Anderson, Spangler & Wymore
ATTORNEYS United States Patent Office 3,460,247
Patented Aug. 12, 1969

3,460,247
METHOD OF MAKING A FLAT TOP COIL
Oliver J. Knutson, Colorado Springs, Colo., assignor, by mesne assignments, to Kaman Sciences Corporation, Colorado Springs, Colo., a corporation of Delaware
Filed Feb. 1, 1966, Ser. No. 524,077
Int. Cl. H04r 9/04; H01f 5/00
U.S. Cl. 29—605                                             6 Claims

ABSTRACT OF THE DISCLOSURE

An open faced coil and method of making same which includes providing an insulated coil form and a heat vaporizable coil support in spaced relation, winding and securing a coil of wire onto the coil form and into the space between the coil form and the support. The coil form, support and coil are subject to an elevated temperature less than that which the coil form can withstand but sufficiently high to vaporize the support and leave one side of the coil exposed while maintaining the coil in wound configuration.

---

The article of manufacture of this invention is an open face coil suitable for use in a pressure transducer such as that forming the subject matter of copending application, S.N. 250,180, filed Jan. 8, 1963, for "Transducer," now U.S. Patent No. 3,238,479 issued Mar. 1,1966, which has been assigned to the same assignee as this application.

In the manufacture of transducers wherein the proximity of a relative large metal sheet to a coil is determined as a function of the electrical effect of such proximity on the electrical characteristics of the coil, as in the eddy current transducer of applicant's application, it is extremely important that the coil and the surface of the coil presented to the sheet be essentially parallel to and uniformly spaced from all adjacent portions of the coil. Thus, the surface of the coil must be made to conform to the shape of the sheet, diaphragm or other object the proximity of which to the coil is to be determined as a function of the electrical characteristic of the coil. Where the sheet or diaphragm is restrained with respect to the coil, the proximity thereof to the coil may give rise to a determination of the forces, i.e., pressure, acceleration and the like, as a function of the electrical characteristics of the coil.

It is the principal object of the present invention to provide an improved method of producing a disc-shaped open face coil suitable for use in a transducer wherein a maximum amount of the coil windings are closely positioned to complement and conform to the shape of the surface whose proximity is to be detected. The surface to be detected usually is a flat surface but may be either concave or convex. This may be a diaphragm of a pressure transducer or a surface whose distance from the transducer coil is to be determined as in the case of a displacement transducer.

It is a further important object of the present invention to provide a novel and simple procedure for the economical production of a disc-shaped open face transducer coil having a relatively small axial dimension compared with a relatively large radial dimension.

A further object of the present invention is to provide a disc-shaped coil, the active surface of which closely conforms to the shape of the surface whose proximity thereto is to be determined.

In accordance with the invention, the process for the production of a disc-shaped coil having an active surface of predetermined configuration comprises the steps of providing a coil form of insulating material capable of withstanding elevated temperatures and having a surface adapted for supporting one side of a disc-shaped coil, mounting heat vaporizable support means on said coil form having a surface adapted for supporting the other side of a disc-shaped coil with the surfaces being positioned in predetermined spaced relation with respect to one another, winding a coil of wire in the space between the surfaces of the coil form and the support means and subjecting the coil, coil form and coil support to an elevated temperature sufficient to vaporize the support and leave one side of the disc-shaped coil exposed.

For a better understanding of the present invention, together with other and further objects thereof, reference is had to the following description taken in connection with the accompanying drawing and its scope will be pointed out in the appended claims.

In the drawings:
FIGURE 1 is a plan view of a coil form useful in the present invention;
FIGURE 2 is a view along line 2—2 of FIGURE 1;
FIGURE 3 is a view in elevation of the heat vaporizable coil support;
FIGURE 4 illustrates the assembly of the coil form of FIGURES 1 and 2 and the support of FIGURE 3;
FIGURE 5 is a view in elevation, partly in cross section and partly broken away to conserve space, of a completed disc-shaped coil according to the invention;
FIGURE 6 is a plan view of the spacer element positioned to space the support from the coil form; and
FIGURE 7 is a plan view of the finished coil of FIGURE 5.

Referring now to the drawing there is shown a coil form 10 of a suitable high temperature ceramic material, such as aluminum oxide and the like. The coil form 10 may conveniently be in the shape of a cylinder having an axially positioned hole 12 therethrough. The top surface 14 of the form 10 is provided with a groove 16 therein extending from the outer edge or periphery to a point adjacent hole 12. The side 18 of the coil form is provided with a groove 20 intersecting groove 16 and a similar groove 22 is provided in diametrically opposed relation. A pair of lead wires 24 and 26 are elemented to the bottom 28 as at 30 by means of a high temperature cement suitable for securing a metal to ceramics. Such a cement may comprise a composition of matter consisting of zirconium or titanium dioxides and phosphoric acid which may include mica powder and kaolin as additives and is adapted to be cured at elevated temperatures.

The support 32 of FIGURE 3 consists of a body portion 34 which may be of the shape as the coil form 10. One surface 36 of the support has for its purpose the support of one side of a coil 38, FIGURE 5, and is shaped, i.e., curved or flat, in accordance with the desired shape of the top of the coil 38. The support 32 is provided with a peg 40 depending from surface 36 thereof, which peg is sized to fit and be received into hole 12.

In preparation for winding coil 38, the spacer 42, FIGURE 6, is positioned between the coil form 10 and the support 32, as shown dotted in FIGURE 4. The leads 24 and 26 have previously been cemented to coil form 10 by adhesive 30. The spacer 42 is provided with a slot 44 of a size sufficient to receive peg 40 of support 32. With support 32 separated from form 10 by the spacer 42, the portion of the peg protruding from the bottom of the form is upset as at 46 by application of a heated iron and the like or a cement may be applied to the exposed end of peg 40. The spacer 42 is then removed leaving support 32 spaced from form 10 by the thickness of spacer 42. The form 10 is chucked in a jewelers or coil winding lathe for rotation about the axis of hole 12.

A wire having a high temperature insulation thereon is started on peg 40 after having been wrapped on lead 24 as at 48. The form 10 is rotated as the wire is fed into the space between form 10 and support. The wire is continued to be wound thereon until the desired amount is deposited forming coil 38, whereupon the free end thereof is wrapped around lead 26 as at 50. A suitable high temperature insulated wire has been found to be a wire manufactured by REA Magnet Wire Co. of Fort Wayne, Ind. under the trade name of "Cerac S–L." Also, preferably the wire is further coated with a cement, such as that referred to above. This is best accomplished by permitting the wire as it is wound on the form to pass through a gob of the cement, a portion of which adheres to the surface of the wire.

The wound coil is then subjected to a high temperature cure at a temperature sufficiently high to vaporize or sublimate the support 32. The high temperature curing step is preferably carried out at a temperature in excess of about 450° F. to 600° F. at which temperatures the cement composition applied to the wire sets, is cured and the polystyrene support 32 vaporizes. It may be understood that materials other than polystyrene may be used for the support means provided they are vaporizable or sublimatable at temperatures encountered during the high temperature treating step.

It will be appreciated that the coil form 10 be of a heat vaporizable material as well as support 32 whereupon both will be vaporized in the high heat treatment to provide a free standing coil. In such case, the coil form 10 and support 32 may be a unitary structure and the resulting coil will be self-supporting and held in shape by the cement applied as the wire is wound.

While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the spirit and scope of the invention.

What is claimed is:

1. A method for the production of a disc-shaped transducer coil having an active surface of predetermined configuration which comprises the steps of:
    providing a coil form of insulating material capable of withstanding an elevated temperature having one surface thereof adapted for supporting one side of a disc-shaped coil;
    mounting a high temperature vaporizable support means on said coil form, said support means having a surface positioned in predetermined spaced relation to said one surface and adapted for supporting the other side of a disc-shaped coil in the predetermined configuration;
    winding and securing a coil of wire onto the coil form and into the space between the surfaces of coil form and support means; and
    subjecting the coil, coil form, and support means to an elevated temperature less than the elevated temperature which the coil form can withstand but sufficient to vaporize the support means and leave one side of the formed coil exposed while maintaining coil in wound configuration.

2. The method of claim 1 wherein the support means is formed of polystyrene and the coil, coil form and support are exposed to temperatures in excess of about 600° F. to vaporize the support means.

3. The method of claim 1 wherein the wire is covered with insulation and is coated with a high temperature cement during the winding step.

4. The method of forming an open face coil for use in a transducer which comprises the steps of:
    providing a coil form of high temperature ceramic having one surface thereof adapted to support the bottom of the coil;
    mounting a supporting means on the coil form, said means having a substantially planar surface positioned in predetermined spaced opposed relation to the coil supporting surface of the coil form adapted to support and shape the top surface of the coil, said supporting means being heat vaporizable;
    winding and securing a coil of insulated wire on the coil form and in the space therebetween and the supporting means to form a coil whose top conforms to the shape of the supporting surface of the supporting means; and
    subjecting the coil, coil form and supporting means to an elevated temperature less than that which the coil form is capable of withstanding but sufficiently high to vaporize the supporting means leaving the top of the coil exposed while maintaining the coil in wound condition.

5. The method of claim 4 wherein the wire is coated with a high temperature cement as it is wound onto the coil form which sets when subjected to the high temperature treatment to hold the coil in the predetermined configuration.

6. The method of claim 5 wherein the supporting means consists of polystyrene and the high temperature treatment is carried out at a temperature in excess of about 600° F.

References Cited

UNITED STATES PATENTS

| | | | |
|---|---|---|---|
| 1,944,870 | 1/1934 | Apple | 29—605 X |
| 2,489,867 | 11/1949 | D'Orio. | |
| 2,974,079 | 3/1961 | Korotkevich | 156—155 X |
| 2,988,804 | 6/1961 | Tibbetts | 29—423 X |
| 3,135,044 | 6/1964 | Mote et al. | 29—423 |
| 3,169,234 | 2/1965 | Renskers | 336—198 X |
| 3,182,384 | 5/1965 | Carlson et al. | 29—605 |
| 3,201,849 | 8/1965 | Voss | 29—605 X |

CHARLIE T. MOON, Primary Examiner

C. E. HALL, Assistant Examiner

U.S. Cl. X.R.

29—423; 242—118; 336—198, 205, 208